United States Patent Office 2,923,715
Patented Feb. 2, 1960

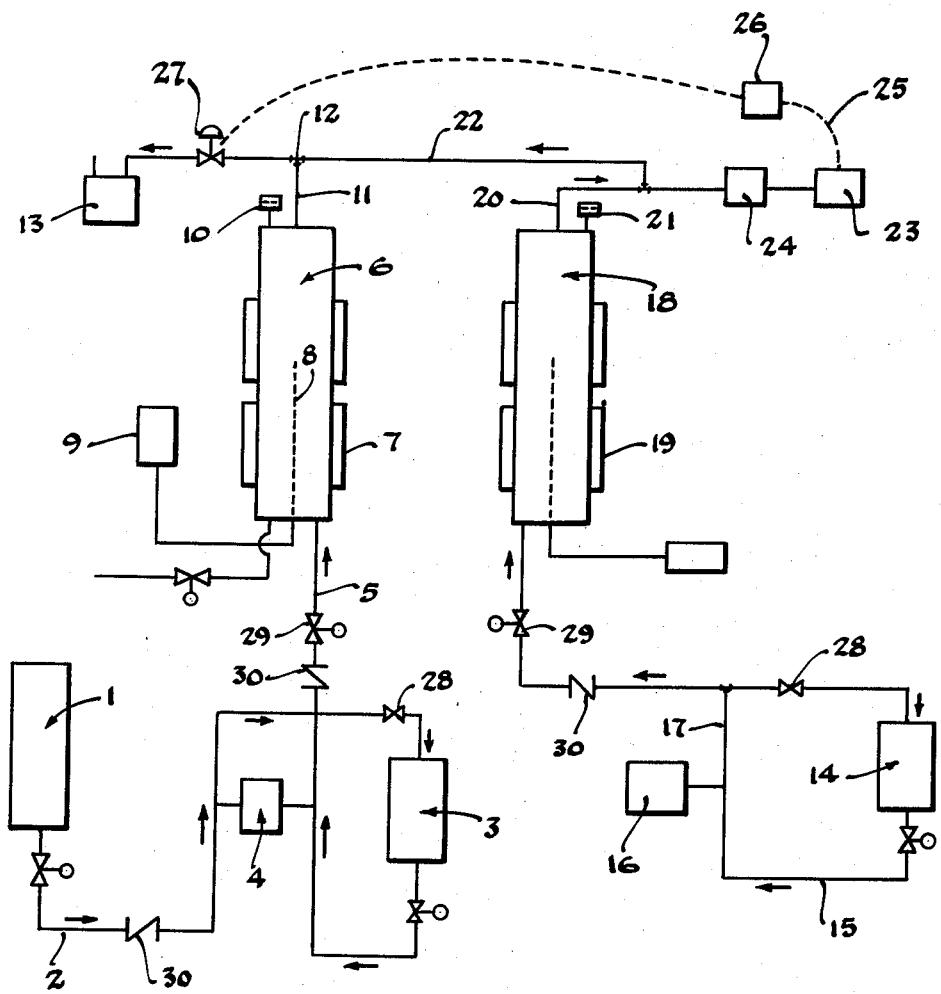

2,923,715

CHEMICAL PROCESS

Morris Freifelder, Waukegan, George M. Illich, Jr., Lake Forest, and Ralph M. Robinson, Chicago, Ill., assignors to Abbott Laboratories, Chicago, Ill., a corporation of Illinois Application January 9, 1957, Serial No. 633,250

4 Claims. (Cl. 260—295.5)

The present invention relates generally to an improved chemical process and more particularly to an improved process for the preparation of nicotinamide.

It is of great economic value and importance to devise an efficient process for the preparation of nicotinamide, since this product is very widely used in many pharmaceutical preparations. While the ammonolysis of nicotinic acid esters is a known process for the preparation of nicotinamide, it is highly desirable to find a more expedient and efficient process utilizing this method for the preparation of nicotinamide. Prior methods of ammonolysis of nicotinic acid teach the reaction of nicotinic esters with aqueous or alcoholic ammonia to prepare nicotinamide, but such teachings are characterized by and require prolonged reaction periods in order to prepare the nicotinamide. It is possible to accelerate the reaction by appropriate use of catalysts but this does not eliminate entirely the disadvantage of time delay entailed in obtaining appropriate conditions for the reaction nor the problem of physical limitations which prevents obtaining large yields from single batch runs.

It is, therefore, an object of this invention to obtain high yields of nicotinamide from ammonolysis of nicotinic acid esters through relatively short reaction periods made possible by having high temperatures and pressures within the reaction area.

Another object of the present invention is to provide a process and apparatus for continuous production of the nicotinamide under conditions of elevated temperatures and pressures.

A further object of this invention is to provide a process and apparatus which eliminates the delay of time involved in elevating the temperature and pressure to achieve rapid reaction and subsequently reducing the elevated temperature and pressure to allow removal of the reaction product from the reaction area.

A still further object of this invention is to provide a continuous process and apparatus whereby the physical dimensions limiting the yield in single batch operations are avoided.

Other objects will be apparent from a study of the following detailed description of the process practiced in apparatus as set out in the following detailed description and the accompanying diagrammatic drawing.

In accomplishing the foregoing objects there is provided a pressure-tight enclosed chamber embodying the law of operation common to autoclaves wherein excess liquid ammonia is combined with nicotinic ester. The sealed chamber is heated and the resultant vaporization of the liquid ammonia creates a high internal pressure under which conditions the ammonolysis of the nicotinic ester occurs in a relatively short time. The reaction product is dissolved in the free alcohol formed from the ammonolysis of the nicotinic acid ester. The product precipitates from solution after cooling or after addition of an appropriate incompatible solvent. A chamber suitable for use in the batch process of the present invention, is a one liter rocker-type autoclave fitted with a thermocouple and pressure gauge.

The principles of this invention can be practiced by the single batch method as heretofore indicated and also by a continuous process which possesses the additional advantage of eliminating the delay of time involved in initial elevation of temperature and pressure to achieve conditions for the reaction and subsequent reduction thereof for removal of the reaction product.

The continuous process is practiced by providing a reaction zone with a continuous source of liquid ammonia and a source of a suitable nicotinic acid ester mixed with an alcohol solvent in a feed tank. The contents of the respective tanks pass through proportioning pumps which force the combined reactants into a high pressure reactor or autoclave wherein the ammonolysis of the nicotinic acid ester occurs. The product stream passes continuously from the autoclave into a flow line where it is combined with a preheated stream of alcohol solvent and discharged into a receiver. The alcohol solvent keeps the nicotinamide product in solution until it is removed from the closed system. The preheated solvent is delivered to the selected point of contact with the nicotinamide product solution from a similarly designed continuous process apparatus consisting of a gravity feed tank containing the solvent, a pump, a heating chamber and a flow line from the heating chamber which conveys the heated alcohol solvent into a feed line where said alcohol stream is combined with the product stream and such combined streams then pass out of the closed system by way of a control valve.

Referring to the schematic drawing, liquid ammonia passing from a cylinder 1 and a nicotinic acid ester in an appropriate alcohol solvent flowing from a feed reservoir tank 3 are proportioned through opposite sides of a double-feed proportioning pump 4. The ammonia is preferably removed from the cylinder 1 by a vapor pressure of 153 p.s.i. (80° F.) arising from the liquid-vapor interphase within the cylinder 1. The ester-alcohol mixture passes from the feed tank 3 under the force of gravity. The flow line 2 and pump body 4 are preferably encased in Dry Ice to prevent vaporization of the liquid ammonia thus preventing vapor-binding in the pump. The two streams pass from a pump 4 into the flow line 5 where said streams are mixed prior to entering the vertical tubular autoclave 6. The autoclave has attached thereto two sections of electric strip heaters 7 which are controlled by separate variable transformers providing a maximum of two kilowatts of heat. The temperature within the autoclave 6 is measured at various levels by a movable pencil type thermocouple 8 traveling in a well extending above the top level of the electric heaters 7. The temperature is desirably recorded on a strip chart potentiometer 9. The autoclave 6 has in the embodiment described an internal diameter of 1.5 inches, an external diameter of 2.56 inches, and is 36 inches long. The autoclave 6 is also preferably constructed of type 316 stainless steel through which apertures are provided for the ingress of the stream of reactants and the egress of the nicotinamide product stream. Heat resistant gaskets with blue asbestos filler are used to seal the system. The autoclave contains thereon a rupture disc 10 which will relieve pressure when the maximum pressure suitable for safe operation is exceeded. Two half sections of removable pipe insulation preferably surround the autoclave 6 and the electric heaters 7.

The continuous process is a substantially liquid-filled system. Consequently, the high pressure within the autoclave 6 is attained by an initial liquid expansion coincident with the application of heat thereafter maintained by the compressing activity of the pump 4 directing the liquid streams into the autoclave 6.

The nicotinamide stream passes from the autoclave 6 by way of flow line 11 thereafter making contact with a preheated stream of alcohol solvent at the junction 12 in flow line 22. The combined streams are exhausted into the vented receiver 13 through a pneumatically controlled valve 27.

The preheated stream of alcohol solvent is introduced into the flow line at the junction 12 by a continuous system similar to the one incorporated for the reactants. A feed reservoir tank 14 feeds the alcohol solvent through flow line 15 into the proportioning pump 16, whence it passes into the flow line 17 and then into the base of the preheater 18. The preheater 18 is similar in structure to the autoclave 6. The heated solvent stream passes from the preheater into the flow line 20 whence it is directed into flow line 22. A pressure indicator and transmitter 23 indicates the pressure within the closed system and transmits a corresponding low pressure pneumatic signal along air line 25 to a pressure controller 26 where such signal is compared with a control signal in the pressure controller 26. The difference in pressure is carried as a pneumatic impulse to the control valve 27 thus operating the control valve 27 which exhausts the combined streams from the closed system into the vented receiver 13. The solvent flow system prevents the product stream from making contacts with the porous metallic filter 24. In the absence of this precautionary measure accumulation of the product stream from the autoclave 6 near the porous metallic filter 24 may result in plugging the filter 24 which normally protects the pressure transmitter and indicator 23. This condition would inactivate the protection afforded by the pressure controller and would allow pressure build-up in the system until the system until failure of the rupture discs 10 and 21 would occur.

Relief valves 28 protect the pumps 4 and 16 from excessive pressures. Check valves 30 located in appropriate positions prevent the back flow of the solvent and reactant streams.

The following examples illustrate the applicability of the principles of this invention to the continuous process and the single batch run. It is to be understood, however, that the examples serve by way of illustration only and are not intended to limit the application thereof to the ammonolysis of the named esters or to specified operating conditions.

EXAMPLE I

Hexyl nicotinate, 103.6 grams (0.5 mole), is placed in one liter rocker-type autoclave reactor and 117 cc. (5.0 mols) of liquid ammonia is added thereto. The reaction vessel is sealed and heated until the temperature within the reactor is about 225° C. at which temperature the reaction is continued for about 30 minutes. The pressure within the reactor at the time the temperature reaches 225° C. is about 900 p.s.i. After cooling the contents of the reactor, dry ether in excess is added to precipitate the nicotinamide from the formed alcohol. The product is separated by filtration or distillation in a yield of 45.3 grams or 74.3% of theory. The product has a melting point of 126–128° C.

EXAMPLE II

The ester 2-ethylhexyl nicotinate, 110.0 grams (0.467 mole), is placed in a one liter rocker-type autoclave reactor and 25 cc. of methanol and 100 cc. of liquid ammonia is added thereto. The reaction is performed in the manner and under the conditions outlined in Example I. After cooling the reactor, 500 cc. of dry ether is added to the mixture and then the formed nicotinamide is separated by filtration in a yield of 35 grams or 61.5% of theory. The filtrate is washed with ether and then the ether is separated by distillation. The residue is distilled under reduced pressure to remove the formed 2-ethylhexanol. The residue is recrystallized from benzol and ethanol to provide an additional yield of 9 grams of nicotinamide for a total yield of 44 grams or 77.4%. The melting point of the product is 125° C.

EXAMPLE III

Amyl nicotinate, 38.6 grams (0.2 mole), is placed in a one liter rocker-type autoclave reactor and 23 cc. (1.0 mole) of liquid ammonia is added thereto. The reaction is performed in the manner and under the conditions outlined in Example I. After cooling, the product is precipitated from the formed amyl alcohol by the addition of excess ether. The nicotinamide is separated by filtration in a yield of 15.2 grams or 62.3%. The product has a melting point of 124° C.

EXAMPLE IV

The reactants and steps of Example III are repeated, however, the reaction is continued at 225° C. for 2 hours instead of the 30 minute periods heretofore employed. The yield of the product is 18.5 grams or 76% of theory and the melting point is 125° C. Increasing the reaction time 300% results in increasing the yield less than 14%.

EXAMPLE V

Liquid ammonia is placed in the inverted cylinder and a mixture of 2-ethylhexyl nicotinate and methanol is placed in a feed tank reservoir. Addition of methanol to the ester results in a more intimate contact of the ammonia with the ester. The mole ratio of this mixture is two moles of methanol to one mole of the ester or 0.272 gram of methanol per gram of ester. The liquid ammonia and the ester-methanol mixture are fed by means of a proportioning pump set at the desired rate of flow so that the approximate mole ratio of the ammonia to the ester is 14.9 to 1 or 1.09 grams of ammonia per gram of ester. The reactant stream passes from the pump into the high pressure reactor where the reaction occurs at a maximum temperature of 220° C. under a pressure of 1400 p.s.i. The contact time of the reactants within the high pressure reactor is expressed in terms of space velocity, i.e., liters/hour of the ester/liter space of the reactor. The space velocity for this reaction is 0.192 liter/hour of the ester/liter reactor space. After the reaction is concluded, the product stream passes from the reactor into the flow line where it comes into contact with a stream of preheated methanol. It is then combined with this methanol stream and emitted through the pneumatically controlled valve into a vented receiver. The methanol stream is proportioned through a pump into a preheater cylinder at a controlled rate of flow so that the ratio of the total methanol to the ester in the continuous process is 17.7 to 1 or 2.41 grams of methanol per gram of ester. The preheater is operated at a temperature of 175° C. to heat the methanol before it is introduced into the flow line to make contact with the product stream from the high pressure reactor. This heated stream of methanol carries the product stream into the vented receiver where it maintains the product in solution. The continuous stream of heated methanol precludes any possibility of the nicotinamide product settling in and plugging the micrometallic filter protecting the pressure transmitter and indicator.

The yield of the nicotinamide product is 80%. Recovered 2-ethylhexyl nicotinate is 6%. Recovered 2-ethylhexanol is 81.7%.

EXAMPLE VI

The effect of various temperatures, pressures, space velocities and reactant concentrations on the yield of nicotinamide from the ammonolysis of 2-ethylhexyl nicotinate by the continuous process according to the procedure of Example II are shown in the following Table I.

Table I

| Conditions | Continuous Runs | | | | |
|---|---|---|---|---|---|
| | 1 | 2 | 3 | 4 | 5 |
| High Pressure Reactor Temperature, Maximum, °C | 240 | 234 | 285 | 225 | 204 |
| Pressure, p.s.i.g. | 1,400 | 700 | 1,400 | 1,400 | 1,400 |
| Space Velocity, liters/hr. ester, liter/reactor | 0.36 | 0.376 | 0.278 | 0.337 | 0.582 |
| Mole ratio of $NH_3$ to ester | 8.2-1 | 9.7-1 | 12.9-1 | 6.7-1 | 5.2-1 |
| Mole ratio of alcohol to ester, feed | 1-1 | 1-1 | 1-1 | 2-1 | 1-1 |
| Mole ratio of alcohol to ester, total | 17-1 | 19.1-1 | 25.5-1 | 18.8-1 | 10.6-1 |
| Alcohol Preheater Temperature, °C | 198 | 191 | 168 | 171 | 173 |
| Yield of amide, wt. percent | 65.6 | 51.5 | 61.7 | 73.2 | 31.6 |
| Recovered 2-ethylhexyl nicotinate, wt. percent | 10.9 | 8.4 | 7.6 | 12.8 | 35.7 |
| Recovered 2-ethylhexanol, wt. percent | 88.1 | 90.0 | 71.5 | 88.4 | 82.9 |

It will be apparent that in the continuous process at a given pressure and at the high operating temperature of the present invention, the space velocity should be increased in order to avoid decomposition and lower yields of nicotinamide. Also, an increase in the reactor pressure results in an increase in the yield of the nicotinamide product at a given temperature and space velocity. The selected levels of pressure and space velocity resulting in high yield of the nicotinamide product (80%) in the continuous process are not intended to exclude the use of higher pressure and/or lower space velocity to attain comparable or greater yields of nicotinamide product.

The use of high temperatures and pressures in the ammonolysis of nicotinic acid esters results in good yields over relatively short periods of reaction when the reaction is performed both by the single batch and the continuous process. Higher pressures will result in greater yields but the attained pressure is physically limited by the apparatus employed. In the single batch process the limiting factor is the dimension of the bomb and the amount of liquid ammonia placed therein. In the continuous process, the limiting element is the driving force of the proportioning pumps and the limits of stress to which the apparatus is subject. Attainable pressures of greater magnitude within the scope of the specification and claims are not meant to be excluded.

The disclosed process can be used in the manner described herein for the ammonolysis of any chain and branched aliphatic esters of nicotinic acid such as propyl, butyl, amyl, n-hexyl and the like.

Others may readily adapt the invention for use under various conditions of service, by employing one or more of the novel features disclosed or equivalents thereof. As at present advised with respect to the apparent scope of our invention, we desire to claim the following subject matter.

We claim:

1. A process for preparing nicotinamide comprising the ammonolysis of 2-ethylhexyl nicotinate in methanol with excess liquid ammonia by a continuous process whereby 14.9 moles of liquid ammonia and one mole of 2-ethylhexyl nicotinate in 2 moles of methanol are proportioned into a high pressure reaction zone in a closed, substantially liquid-filled system, said ammonia and nicotinate reacting in said zone at a temperature of 220° C. and a pressure of 1400 p.s.i.g. at a flow rate of about 0.2 liter nicotinate/hour/liter reactor space to form nicotinamide, said nicotinamide product stream combining with a preheated methanol stream, said combined streams exhausting out of the closed system, thereafter, separating and collecting the nicotinamide.

2. A process for preparing nicotinamide comprising heating one mole of 2-ethylhexyl nicotinate with excess liquid ammonia in a closed chamber for a period of about one-half hour at a temperature of about 225° C. and a pressure of about 900 p.s.i.

3. A process for preparing nicotinamide comprising the ammonolysis of a 3-8 carbon aliphatic ester of nicotinic acid with excess liquid ammonia by a continuous process whereby said liquid ammonia and the said aliphatic ester of nicotinic acid in a lower aliphatic monohydroxy alcohol solvent are continuously proportioned into a high-pressure reactor zone in a closed substantially liquid-filled system, ammonolysis occurring in said reactor to form the nicotinamide at a temperature within the range of 220–285° C., a pressure within the range of 900–1400 p.s.i. and a space velocity within the range of 0.2–0.6, thereafter separating and collecting the nicotinamide.

4. In the process for preparing nicotinamide by ammonolysis of an aliphatic ester of nicotinic acid, the steps which comprise adding a 3-8 carbon aliphatic ester of nicotinic acid to excess liquid ammonia, heating said mixture in a closed chamber for a period of about one-half hour at a temperature between 220–285° C. and at a pressure between 900–1400 p.s.i.

References Cited in the file of this patent

UNITED STATES PATENTS

| | | |
|---|---|---|
| 2,280,040 | Seibert et al. | Apr. 14, 1942 |
| 2,314,843 | Hultquist et al. | May 23, 1943 |
| 2,617,805 | Wissow | Nov. 11, 1952 |
| 2,752,355 | Lustig | June 26, 1956 |

OTHER REFERENCES

King et al.: Fiat Final Report No. 940, p. 24 (Sept. 30, 1946).

Organic Synthesis, vol. 21, pp. 71–73, Wiley and Sons, New York (1941).

La Forge: J. Am. Chem. Soc., vol. 50, p. 2480 (1928).

Wojick et al.: J. Am. Chem. Soc., vol. 56, p. 2421 (1934).